United States Patent Office 3,183,255
Patented May 11, 1965

3,183,255
ESTERS OF DIPHENYL ACETOHYDROXAMIC AND ALPHA-HYDROXY-DIPHENYL ACETOHYDROXAMIC ACIDS WITH TERTIARY AMINO ALCOHOLS
Joseph Levy, Paramus, N.J., assignor to Universal Oil Products Company, Des Plaines, Ill., a corporation of Delaware
No Drawing. Filed Sept. 17, 1962, Ser. No. 224,236
6 Claims. (Cl. 260—453)

This invention relates to compositions of matter comprising hydroxamate esters and to methods for the preparation thereof. More particularly this invention is concerned with nitrogen substituted alkyl esters of substituted hydroxamic acids, the acid salts and quaternary compounds thereof and to methods for the preparation of said compounds.

It has now been discovered that novel compositions of matter, such as nitrogen substituted alkyl esters of substituted hydroxamic acids and particularly substituted aminoalkyl esters of diaryl substituted acetohydroxamic acids, are useful compounds in the medical field, particularly as anti-spasmodic and anticholinergic drugs.

It is, therefore, an object of this invention to prepare diaryl acetohydroxamate esters which may be utilized as therapeutic agents.

A further object of this invention is to prepare substituted aminoalkyl esters of diaryl substituted acetohydroxamic acids which may be utilized as therapeutic agents.

Taken in its broadest aspect, one embodiment of this invention resides in a process for the preparation of a substituted aminoalkyl ester of a diaryl substituted acetohydroxamic acid which comprises condensing a diaryl substituted acetohydroxamic acid with a substituted aminoalkyl halide in an alkaline medium, and recovering the desired substituted aminoalkyl ester of a diaryl substituted acetohydroxamic acid.

A further embodiment of this invention is found in a process for the preparation of a N,N-dialkylaminoalkyl ester of a diaryl substituted acetohydroxamic acid which comprises condensing a diaryl substituted acetohydroxamic acid with a N,N-dialkylaminoalkyl halide in an alkaline medium, and recovering the desired N,N-dialkylaminoalkyl ester of a diaryl substituted acetohydroxamic acid.

Yet another embodiment of this invention is found in a substituted aminoalkyl ester of a diaryl substituted acetohydroxamic acid.

A specific embodiment of this invention resides in a process for the preparation of a N,N-dialkylaminoalkyl ester of a diaryl substituted acetohydroxamic acid which comprises condensing a diaryl substituted acetohydroxamic acid with 2-chloro-N,N-diethylethylamine in an alkaline medium, and recovering the desired 2-diethylaminoethyl ester of a diaryl substituted acetohydroxamic acid.

A further specific embodiment of this invention is found in a process for the preparation of a N,N-dialkylaminoalkyl ester of a diaryl substituted alpha-hydroxyacetohydroxamic acid which comprises condensing alpha-hydroxydiphenylacetohydroxamic acid with 2-chloro-N,N-diethylethylamine in an alkaline medium, and recovering the desired 2-diethylaminoethyl alpha-hydroxydiphenylacetohydroxamate.

Yet another specific embodiment of this invention is found in 2-diethylaminoethyl diphenylacetohydroxamate.

Other objects and embodiments referring to alternative substituted aminoalkyl halides and diaryl substituted acetohydroxamic acids will be found in the following further detailed description of this invention.

As hereinbefore set forth, it has now been discovered that the hydroxamic esters of this invention may be prepared by condensing a substituted aminoalkyl halide with a diaryl substituted acetohydroxamic acid in the presence of an alkaline agent to prepare the desired products. These desired products possess the generic formula:

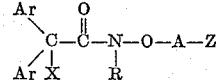

in which Ar is an aromatic radical selected from the group consisting of phenyl, alkylphenyl, halophenyl and alkoxy phenyl radicals, X is selected from the group consisting of hydrogen and hydroxyl radicals, R is selected from the group consisting of hydrogen and alkyl radicals containing from 1 to about 5 carbon atoms, A is selected from the group consisting of straight and branched chain alkylene groups of 2 to 5 carbons and Z is a secondary amino radical selected from the group consisting of di-(loweralkyl) amino and cyclic amino groups selected from the group consisting of piperidino, pyrrolidino, morpholino, piperidyl, and pyrrolidyl radicals, the alkyl portion of the di-(loweralkyl) amino radicals containing from 1 to about 5 carbon atoms. For purposes of this invention the terms "piperidino, pyrrolidino, morpholino, piperidyl and pyrrolidyl" as used in the specification and appended claims will refer to both unsubstituted and alkyl substituted radicals. These compounds may be conveniently prepared by reacting a diaryl substituted acetohydroxamic acid having the generic formula:

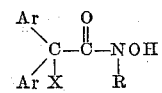

in which the Ar, R and X radicals have the same meaning as above with a substituted aminoalkyl halide having the generic formula:

in which the A and Z radicals have the same meaning as in the above formula and Hal is a halogen having an atomic weight of from 35 to 80 (i.e., chlorine or bromine) preferably chlorine, since the chlorine-containing compounds are more readily available, in the presence of an alkaline substance.

Examples of diaryl substituted acetohydroxamic acids which may be used in the process of this invention include diphenylacetohydroxamic acid,
di-(o-tolyl) acetohydroxamic acid,
di-(m-tolyl) acetohydroxamic acid,
di-(p-tolyl) acetohydroxamic acid,
p-methoxydiphenylacetohydroxamic acid,
p-chlorodiphenylacetohydroxamic acid,
p-methyldiphenylacetohydroxamic acid,
di-(o-methoxyphenyl) acetohydroxamic acid,
di-(m-methoxyphenyl) acetohydroxamic acid,
di-(p-methoxyphenyl) acetohydroxamic acid,
di-p-chlorophenylacetohydroxamic acid,
alpha hydroxydiphenylacetohydroxamic acid,
alpha-hydroxy-di-(p-tolyl) acetohydroxamic acid,
alpha-hydroxy-p-chlorodiphenylacetohydroxamic acid,
alpha-hydroxy-p-methoxydiphenylacetohydroxamic acid,
alpha-hydroxy-p-methyldiphenylacetohydroxamic acid,
etc.

Examples of substituted aminoalkyl halides in which the nitrogen may be di-substituted or may form a part of a heterocyclic ring and which falls within the generic formula hereinbefore set forth include 2-chloro-N,N-dimethylethylamine,
2-bromo-N,N-dimethylethylamine,
2-chloro-N,N-diethylethylamine, 2-bromo-N,N-diethylethylamine,
2-chloro-N,N-dipropylethylamine,
2-chloro-N,N-dibutylethylamine,
3-chloro-N,N-dimethylpropylamine,
3-chloro-N,N-diethylpropylamine,
3-chloro-N,N-dipropylpropylamine,
3-chloro-N,N-dibutylpropylamine,
2-chloro-N,N-dimethylisopropylamine,
2-chloro-N,N-diethylisopropylamine,
2-chloro-1-piperidinoethane,
2-chloro-1-(2-N-methylpiperidyl) ethane,
2-chloro-1-pyrrolidinoethane,
2-chloro-1-morpholinoethane,
3-chloro-1-piperidinopropane,
3-chloro-1-pyrrolidinopropane,
3-chloro-1-morpholinopropane, etc.

It is to be understood that the aforementioned compounds are only representatives of the class of compounds which may be used and that the present process is not necessarily limited thereto.

One method of preparation of the desired products according to the process of this invention involves the reaction of a diaryl substituted acetohydroxamic acid of the type hereinbefore set forth with the substituted aminoalkyl halide also of the type hereinbefore set forth in the presence of a mol of an alkaline substance. In the preferred method of utilizing the process of this invention the diaryl substituted acetohydroxamic acid is treated with the alkaline substance whereby the alkali metal or alkaline earth metal salt of the substituted hydroxamic acid is formed. Following this the substituted aminoalkyl halide is added and the reaction allowed to proceed. As hereinbefore set forth the reaction may be effected in the presence of water or an alcohol such as methyl alcohol, ethyl alcohol, propyl alcohol, isopropyl alcohol, etc. Alternatively, the desired products of the present invention may be prepared by reacting a previously formed alkali metal or alkaline earth metal salt of a diaryl substituted acetohydroxamic acid with the substituted aminoalkyl halide in an anhydrous liquid reaction medium such as dimethylformamide, dimethylsulfoxide, tetrahydrofuran, dimethoxyethane, benzene, toluene, xylene, n-heptane, etc. Alkaline substances which may be utilized to prepare the alkali metal or alkaline earth metal salts include potassium hydroxide, sodium hydroxide, lithium hydroxide, barium hydroxide, sodium methylate, sodium ethylate, etc.

About equimolar amounts of the reactants may be used or, if desired, an excess of the substituted aminoalkyl halide can be added. The reaction proceeds at room temperature although elevated temperatures up to the reflux temperature of the solvent employed may be used to increase the reaction rate. After the reaction is completed, the product may be isolated by conventional means taking advantage of the relative acidic and basic properties of the materials present to achieve separation and purification.

While the general method of synthesis described hereinabove is satisfactory for the preparation of the compounds of this invention, we do not wish to be limited thereto, inasmuch as other synthetic procedures suggest themselves. Thus, for example, it appears feasible to prepare the desired products by the reaction of the acid halide of a diarylsubstituted acetic acid of the type described with the appropriate hydroxylamine derivative such as a substituted aminoalkoxyamine of the general formula

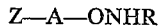

Z—A—ONHR where the terms Z, A and R have the same meaning as hereinbefore set forth. Where it is desired to have an alpha hydroxyl group in the diarylacetic acid moiety of the product, one may start with the acid halide of a alpha-halo or alpha-acetoxy diarylacetic acid and subsequently hydrolyze these groups to hydroxy. The reaction may be carried out in an inert solvent of the type hereinbefore set forth and, if desired, in the presence of a tertiary amine such as pyridine, triethylamine, tributylamine, etc. as an acceptor for the hydrogen chloride liberated.

The acid addition salts of the compounds of this invention are prepared by contacting the free bases with a suitable mineral acid or organic acid such as hydrochloric acid, sulfuric acid, phosphoric acid, tartaric acid, citric acid, maleic acid, fumaric acid, oxalic acid, etc. The quaternary compounds are also readily produced by reacting the free base with an alkyl halide, sulfate, toluenesulfonate, etc. in a suitable solvent according to well-known procedures. Both the acid addition salts and the quaternary compounds may be formulated into suitable pharmaceutical forms such as tablets and capsules for oral administration or solutions for parenteral administration for therapeutic use in animals or humans.

Examples of substituted aminoalkyl esters of diaryl substituted hydroxamic acids which may be prepared according to the process of this invention include 2-dimethylaminoethyl diphenylacetohydroxamate,
2-diethylaminoethyl diphenylacetohydroxamate,
2-diethylaminoethyl diphenylacetohydroxamate methobromide,
2-diethylaminoethyl diphenylacetohydroxamate methiodide,
2-dipropylaminoethyl diphenylacetohydroxamate,
2-dibutylaminoethyl diphenylacetohydroxamate,
2-dimethylaminopropyl diphenylacetohydroxamate,
3-dimethylaminopropyl diphenylacetohydroxamate,
3-diethylaminopropyl diphenylacetohydroxamate,
2-dimethylaminoethyl alpha-hydroxydiphenylacetohydroxamate,
2-diethylaminoethyl alpha-hydroxydiphenylacetohydroxamate,
2-diethylaminoethyl alpha-hydroxydiphenylacetohydroxamate methobromide,
3-dimethylaminopropyl alpha-hydroxydiphenylacetohydroxamate,
2-piperidinoethyl diphenylacetohydroxamate,
2-piperidinoethyl alpha-hydroxydiphenylacetohydroxamate,
2-(2-N-methylpiperidyl) ethyl diphenylacetohydroxamate,
2-pyrrolidinoethyl diphenylacetohydroxamate,
2-morpholinoethyl diphenylacetohydroxamate, etc.

The following examples are given to illustrate the process of the present invention which, however, are not intended to limit the generally broad scope of the present invention in strict accordance therewith.

*Example I*

In this experiment 45.5 grams (0.2 mol) of diphenylacetohydroxamic acid were added to 250 grams of 10% aqueous potassium hydroxide solution. Partial crystallization of the potassium salt of the acid occurred. A solution of 43 grams (0.25 mol) of 2-chloro-N,N-diethylethylamine hydrochloride in 80 grams of water was then slowly added with constant stirring during a period of about 2 hours while maintaining the temperature of the reaction in a range of from about 25° to about 30° C. A gummy solid separated out, said solid crystallizing upon standing. The reaction mixture was filtered and the wet cake comprising the precipitate was dissolved in 130 grams of 10% sulfuric acid. The resulting solution was filtered to remove a small amount of undissolved material comprising unreacted diphenylacetohydroxamic acid. Following this, sufficient potassium carbonate was added so that the pH of the mixture was raised to about 9 to 10. The precipitate which formed was extracted with 250 cc. of isopropyl acetate at an elevated temperature of about 70° C. The extract was dried with sodium sulfate, filtered, and cooled to a temperature of between 0 and 5° C. The crystalline precipitate, which formed, was washed with a sufficient amount of fresh isopropyl acetate and dried to yield 47.4 grams of crude 2-diethylaminoethyl diphenylacetohydroxamate. The crystalline precipitate was recrystallized from additional isopropyl acetate to yield a product having a melting point of between 96.8° to 98.6° C. The free base was then converted to the hydrochloride salt by treating said base with anhydrous hydrogen chloride in an isopropyl alcohol solution followed by the addition of ether. The resulting crystalline precipitate was filtered and dried. The hydrochloride salt of 2-diethylaminoethyl diphenylacetohydroxamate had a melting point of 154°-155° C.

*Example II*

6.4 g. 2-diethylaminoethyl diphenylacetohydroxamate were dissolved in 15 cc. methanol plus 25 cc. ethyl ether and 12 g. methyl iodide were added. Reaction proceeded at room temperature with gradual separation of an oil which subsequently crystallized. The product was filtered and recrystallized from ethanol-ether to give the methiodide quaternary derivative melting at 163° C. to 165.8° C. The methobromide quaternary derivative was prepared in a similar manner using methyl bromide instead of methyl iodide. The product melted at 184°-185.5° C.

*Example III*

In this example 11.5 g. of diphenylacetohydroxamic acid were added to 60 g. of 10% aqueous potassium hydroxide solution at a temperature of about 50° C., following which there was added 9.1 g. of 2-chloro-N,N-dimethylethylamine hydrochloride in 25 g. of water. The addition of the latter was accomplished during a period of 2 hours wherein the reaction mixture was maintained at a temperature of between 25° and 30° C. The crude product resulting from the condensation was dissolved in 10% sulfuric acid solution and the unreacted hydroxamic acid which did not dissolve was removed by filtration. The acid solution was then treated with sufficient potassium carbonate until the pH was raised to about 9 to 10, following which the precipitated solids were taken up in isopropyl acetate. The isopropyl acetate layer was separated from the aqueous layer and extracted with 80 cc. of 5% aqueous potassium hydroxide solution. The pH of the aqueous extract was readjusted to about 9 to 10 with dilute sulfuric acid and the resulting product, which separated as a crystalline precipitate, was filtered, washed with water and dried in vacuum and comprised 2-dimethylaminoethyl diphenylacetohydroxamate. The latter compound was then converted to the hydrochloride salt by the addition of anhydrous hydrogen chloride to the product in an isopropyl alcohol-ether solution. The hydrochloric acid salt of 2-dimethylaminoethyl diphenylacetohydroxamate formed colorless crystals which had a melting point of 161.4°-162.4° C.

*Example IV*

In this experiment a mixture of 11.5 grams of diphenylacetohydroxamic acid and 9.5 grams of 3-chloro-N,N-dimethylpropylamine hydrochloride which was dissolved in 100 cc. of methyl alcohol had added thereto 6.5 grams of anhydrous sodium methylate, following which the mixture was heated at reflux (65° C.), for a period of about 56 hours. The mixture was then filtered to remove the sodium chloride which had formed and separated, and the solvent was evaporated to dryness. Following this the residue was treated with 100 grams of 10% aqueous sulfuric acid and the undissolved material comprising unreacted hydroxamic acid was filtered off. Upon adding sufficient potassium carbonate to the mixture so that the pH of said mixture was raised to about 9–10, the product separated from the solution and was extracted with 50 cc. isopropyl acetate. The isopropyl acetate solution which was separated from the aqueous layer was, in turn, extracted with 60 grams of 5% aqueous sodium hydroxide and the pH of the aqueous solution was again adjusted to about 9–10 by the addition of dilute sulfuric acid. The resulting precipitate was taken up in 50 cc. of isopropyl acetate and the solvent evaporated to dryness, the resulting crystals comprising 3-N,N-dimethylaminopropyl diphenylacetohydroxamate. The hydrochloric acid salt of this compound was prepared from an isopropyl alcohol-ether solution by the addition of anhydrous hydrogen chloride and resulted in the obtention of crystalline hydrochloric acid salt of 3-N,N-dimethylaminopropyl diphenylacetohydroxamate, said crystals having a melting point of 160°–161° C.

*Example V*

In this example 6.5 grams of anhydrous sodium methylate were added to a solution comprising 11.5 grams of diphenylacetohydroxamic acid and 9.5 grams of 2-chloro-N,N-dimethyl propylamine hydrochloride dissolved in 100 cc. of methyl alcohol, following which the mixture was stirred at room temperature for about 75 hours. The sodium chloride which formed and precipitated was filtered off and the methyl alcohol then evaporated to dryness. The residue was completely dissolved by the addition of 100 grams of a 10% sulfuric acid solution. Upon adding sufficient potassium carbonate so that the pH of the solution was adjusted to about 9–10 a precipitate formed, which was taken up in 200 cc. of toluene at an elevated temperature of about 65° C. The toluene solution was extracted with 80 grams of a 5% aqueous sodium hydroxide solution and the pH of the aqueous extract again adjusted to about 9–10 by the addition of potassium bicarbonate, a viscous oily material separating at this ponit. This oily material was taken up in 150 cc. of isopropyl acetate, washed with water, and the solvent evaporated to dryness, there being obtained 9.5 grams of residue. This material which comprised 2-dimethylaminopropyl diphenylacetohydroxamate was treated in an isopropyl-ether solution with anhydrous hydrogen chloride, there being obtained 8.7 grams of crystals melting from 126° to 134° C. This product was recrystallized twice from an isopropyl acetate-ether solution to give crystals of 2-N,N-dimethylaminopropyl diphenylacetohydroxamate hydrochloride, the crystals melting at 156°–158° C.

*Example VI*

In this experiment 12.2 grams of alpha-hydroxydiphenylacetohydroxamic acid were dissolved in 50 grams of a 10% aqueous potassium hydroxide solution, partial crystallization of the potassium salt taking place at room temperature. A solution of 11.8 grams of 2-chloro-N,N-diethylaminoethyl hydrochloride in 200 cc. of water was then slowly added at ambient temperature during a period of about 1 hour. During this time an oil gradually separated from the aqueous layer. The mixture was stirred for an additional hour and then acidified by the addition of about 10 grams of 50% sulfuric acid, there being obtained a clear solution. The pH was then adjusted to about 9–10 by the addition of a sufficient amount of potassium carbonate. The liberated base was extracted with 150 cc. of isopropyl acetate at an elevated temperature of about 50° C. Following this the isopropyl acetate solution which was separated from the aqueous layer was extracted with two 50 cc. portions of 5% aqueous potassium hydroxide and the pH of the aqueous extract was again adjusted to about 9–10 by the addition of potassium bicarbonate. The product which separated out was taken up in about 100 cc. of toluene at about 50° C. The extract was washed with water and then evaporated to dryness in vacuum at a temperature of about 40°–50° C., there being obtained about 9.5 grams of crude 2-diethylaminoethyl alpha - hydroxydiphenylacetohydroxamate. The free base was converted to the hydrochloric acid salt in an isopropyl alcohol solution by the addition of anhydrous hydrogen chloride. Upon the addition of ether and the cooling of the solution the hydrochloride salt crystallized out. After two recrystallizations from isopropyl alcohol-ether solution, the pure material comprising the hydrochloric acid salt of 2-diethylaminoethyl alpha - hydroxydiphenylacetohydroxamate was obtained as colorless crystals having a melting point of 154.6°–155.6° C.

*Example VII*

The methobromide quaternary derivative of 2-diethylaminoethyl alpha - hydroxydiphenylacetohydroxamate was prepared according ot the general procedure of Example II. The product melted at 160°–161° C.

*Example VIII*

In this experiment 22.7 grams of diphenylacetohydroxamic acid were added to a solution of 6.6 grams potassium hydroxide in 100 cc. ethanol. Partial crystallization of the potassium salt took place. 16.1 grams 2-chloro-1-(2-N-methylpiperidyl) ethane were added and the mixture refluxed for about 6 hours. The precipitated potassium chloride was filtered off and the solvent removed in vacuum to dryness. The residual oil comprised 2-(2-N-methylpiperidyl) ethyl diphenylacetohydroxamate. Since the hydrochloride salt proved to be hygroscopic, the product was converted to an oxalic acid salt which melted at 154°–156° C.

*Example IX*

The methiodide and methobromide quaternary derivatives of 2-(2-N-methylpiperidyl) ethyl diphenylacetohydroxamate were prepared according to the general procedure of Example II.

I claim as my invention:
1. 2-diethylaminoethyl diphenylacetohydroxamate.
2. 3-dimethylaminopropyl diphenylacetohydroxamate.
3. 2-diethylaminoethyl alpha-hydroxydiphenylacetohydroxamate.
4. A compound of the class consisting of a free base, its addition salts with non-toxic acids and lower alkyl quaternary ammonium salts, said free base having the formula:

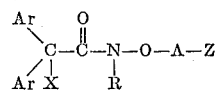

in which Ar is an aromatic radical selected from the group consisting of phenyl, methylphenyl, halophenyl and methoxyphenyl, X is selected from the group consisting of hydrogen and hydroxyl, R is selected from the group consisting of hydrogen and alkyl of from 1 to 5 carbon atoms, A is alkylene of from 2 to 5 carbon atoms and Z is selected from the group consisting of di-(1 to 5 carbon atom alkyl)-amino, piperidino, pyrrolidino and morpholino.
5. 2-diethylaminoethyl alpha-hydroxy-diphenyl-acetohydroxamate methobromide.
6. 2 - diethylaminoethyl diphenylacetohydroxamate methobromide.

References Cited by the Examiner
UNITED STATES PATENTS

| | | | |
|---|---|---|---|
| 1,915,334 | 6/33 | Salzberg et al. | 260—243 |
| 2,075,359 | 3/37 | Salzberg et al. | 167—22 |
| 2,801,247 | 7/57 | Smith et al. | 260—294 |
| 2,841,589 | 7/58 | Brandstrom et al. | 260—294 |
| 2,939,868 | 6/60 | Hegedus | 260—453 |
| 3,052,706 | 9/62 | Goldberg et al. | 260—453 |
| 3,072,701 | 1/63 | Wright et al. | 260—453 |

OTHER REFERENCES

Cooley et al.: "J. Org. Chem.," vol. 25, pages 1734–36, (1960).

IRVING MARCUS, *Primary Examiner.*
NICHOLAS RIZZO, WALTER A. MODANCE,
*Examiners.*